United States Patent [19]

Tokura et al.

[11] Patent Number: 4,562,582
[45] Date of Patent: Dec. 31, 1985

[54] BURST SIGNAL RECEIVING APPARATUS

[75] Inventors: Nobuyuki Tokura; Yoshiro Hakamata, both of Yokosuka; Kimio Oguchi, Yokohama, all of Japan

[73] Assignee: Nippon Telegraph & Telephone Public Corporation, Tokyo, Japan

[21] Appl. No.: 597,867

[22] Filed: Apr. 9, 1984

[30] Foreign Application Priority Data

Apr. 18, 1983 [JP] Japan .................. 58-68035
Feb. 24, 1984 [JP] Japan .................. 59-34816

[51] Int. Cl.$^4$ .......................... H04B 9/00; H04B 1/62
[52] U.S. Cl. ............................ 375/87; 375/18; 375/55; 375/110; 455/608; 455/617; 455/619
[58] Field of Search ........... 375/18, 37, 55, 87, 375/101, 110, 111, 94, 108; 455/608, 619, 617

[56] References Cited

U.S. PATENT DOCUMENTS

| | | | |
|---|---|---|---|
| 3,241,067 | 4/1961 | James et al. | 375/108 |
| 3,829,779 | 8/1974 | Fujimoto | 375/18 |
| 4,276,656 | 6/1981 | Petryk, Jr. | 375/55 |
| 4,355,423 | 10/1982 | Theall | 455/608 |

*Primary Examiner*—Marc E. Bookbinder
*Assistant Examiner*—Marianne Huseman
*Attorney, Agent, or Firm*—Pollock, Vande Sande and Priddy

[57] ABSTRACT

In an apparatus for receiving a burst signal intensity-modulated by a signal obtained by Manchester-code converting each code of an input signal into a pair of codes, the received burst signal is converted by a partial response circuit into an AC signal and then AC-amplified. From the received burst signal is extracted a timing signal of the same frequency as the clock frequency of the Manchester-coded signal. In a decision circuit, the AC-amplified output is decided by the timing signal, through using a decision level close to zero, at the timing of each of former and latter codes of the Manchester-coded pair codes. A coding rule violation is detected in a plurality of successive decision output codes to detect a reception abnormality such as asynchronism and a signal collision. The decision output is decided at the timing of the latter one of the Manchester-coded pair codes, thereby regenerating transmitted information.

30 Claims, 51 Drawing Figures

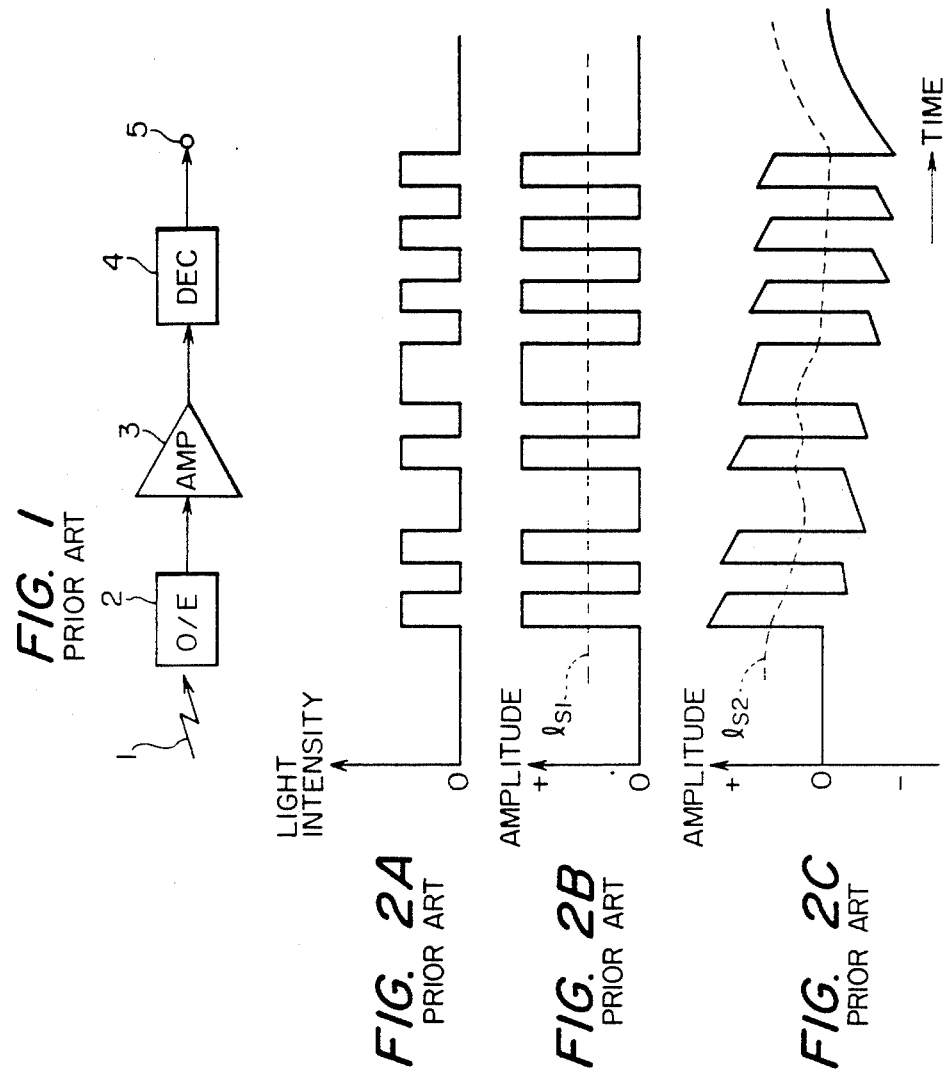

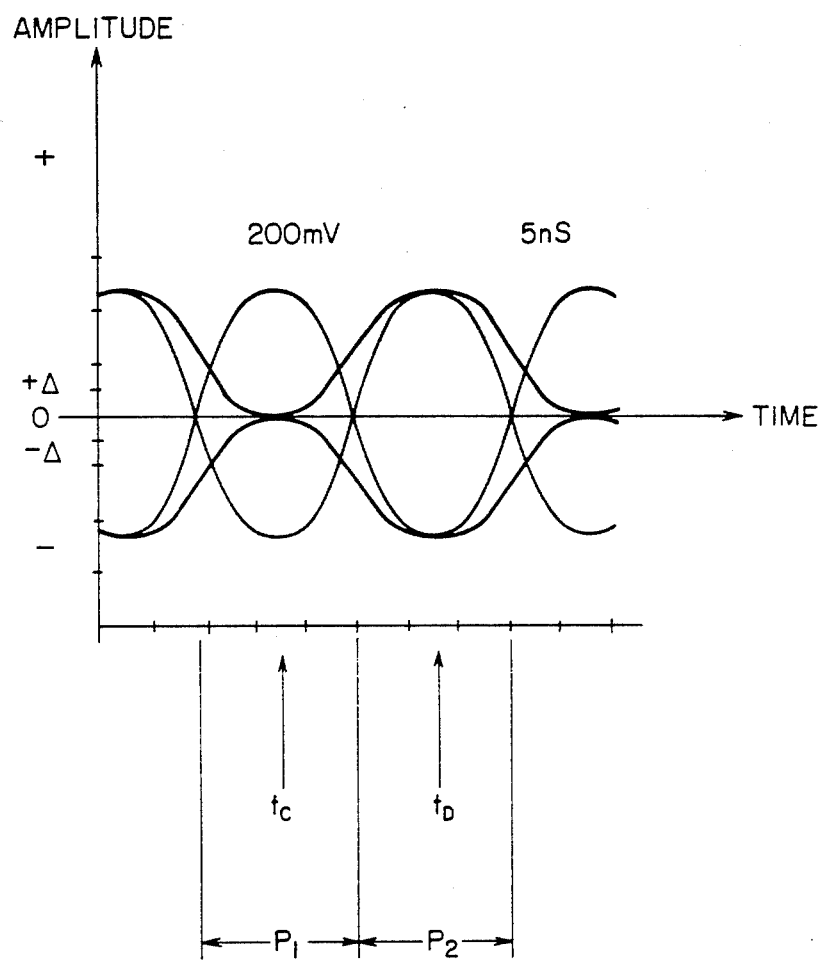

FIG. 6

| | | | | | |
|---|---|---|---|---|---|
| INPUT DATA :A | 0 | 0 | 1 | 0 | 1 |
| MANCH-CODED OUTPUT :C | 1 0 | 1 0 | 1 0 | 1 0 | 0 0 |
| PR(1,-1) OUTPUT:D | x − + 1 − | x 1 0 1 − | x 0 + 0 1 | x + 1 0 − | x + 1 + − |
| INPUT PATTERN TO DEC 4 | ∿ | ∿ | ∿ | ∿ | ∿ |
| THRESH LEVEL −Δ: OUTPUT OF DEC 4 | x 0 1 0 − | x 0 0 0 − | x 0 0 − | x 1 0 − | x 1 0 − |
| CRV | x 0 0 0 | x 0 0 0 | x 0 0 0 | x 1 0 0 | x 1 1 − |
| +Δ: OUTPUT OF DEC 4 | x 0 1 0 − | x 0 0 0 − | x 0 0 0 − | x 1 0 − | x 1 0 − |
| CRV | x 0 0 0 | x 0 0 0 | x 0 0 0 | x 1 0 0 | x 1 1 − |
| DEGENERATED OUTPUT :J | 0 | 0 | 0 | 0 | − |

BURST SIGNAL RECEIVING APPARATUS

BACKGROUND OF THE INVENTION

The present invention relates to an apparatus suitable for receiving an intensity-modulated burst signal, in particular, an intensity-modulated optical burst signal.

In recent years, there has been a strong demand for the construction of Local Area Networks (LAN) and many studies and schemes have been made and carried forward for practical application. Viewed in the light of a combination of the network topology and the control procedure used, the Local Area Networks are showing the trend mainly to a loop- (or ring-) network with token passing control system and a bus-network with CSMA/CD control system. The present invention is directed to the receiving apparatus of the bus network with CSMA/CD control system. As a system using the CSMA/CD control system, there is "Ethernet" by Xerox Corp. This is disclosed, for example, in R. M. Metcalfe et al., "Ethernet: Distributed Packet Switching for Local Computer Networks", Comm. ACM, Vol. 19, No. 7 (1976), pp. 395-404. This Ethernet uses a coaxial cable as a bothway transmission line to form a bus-like transmission line. A plurality of nodes are high-impedance-coupled to the transmission line. In the case of transmitting a message from one of the nodes, it is checked first whether a packet signal from another node exists in the transmission line (CS: Carrier Sense). Where the packet signal from another node exists, i.e. where the transmission line is not idle, the packet signal transmission is deferred, and if the transmission line is idle, a message is transmitted as a packet signal over the transmission line. This signal is received by all the nodes connected to the transmission line, that is, it is arranged as an MA (Multiple Access) system, and each node inputs the packet signal addressed thereto. There is the case where a plurality of nodes simultaneously start the packet signal transmission, and in this case, a signal collision occurs. During transmission each node always monitors the signal collision and, upon detection of the collision (CD: Collision Detection), it stops the transmission, and after a random waiting time, each node starts the procedure for retransmission.

This CSMA/CD control system is utilized not only for transmission by wire but also for transmission by electromagnetic waves and optical signal. In the case of utilizing optical signal, a system employing a star coupler is widely used. That is, an optical output signal from each node is provided to the star coupler disposed as a center node. In the star coupler the optical power of the input signal from any node is uniformly distributed to each optical output terminal, and the power is again introduced into a receiving part of each node. In this case, the transmission system forms, logically, a bus topology but, physically, a star one.

It is desirable that such a burst signal receiving apparatus has short transient response time and it can reach the steady-state receiving condition, permitting reception of correct information in a short time after the start of the reception of the burst signal.

The use of a high-gain, wide-band amplifier capable of amplifying even a DC component, renders such a burst signal receiving apparatus expensive and poor in stability. For this reason, an AC-coupling amplifier is widely employed. In this case, if a DC component is contained in burst signal codes, the influence of transient response at the beginning and the terminating portion of the burst signal cannot be neglected. The transient time can be reduced by increasing the low-frequency range cutoff frequency of the AC-coupling amplifier, but in this case, a low-frequency range cutoff distortion is stressed to degrade the eye pattern, increasing decision errors. It has also been proposed to insert a DC component by using a clamp circuit, but this is defective in that a long guard time is needed when receiving a burst signal of a small level immediately after a burst signal of large level.

Further, it is necessary in the aforesaid CSMA/CD control system that the signal collision be detected without fail. Especially, in the case of the optical burst signal, there is the possibility that the level difference between two colliding signals is a maximum of about 10 dB because of deviation in the optical output, loss by the optical fiber, a loss deviation of the star coupler, connector loss and splicing loss. Even such a collision of signals of greatly different levels must be detected quickly and with certainty. As a solution to this problem, there has been proposed a system in which the mean receiving level greater than a predetermined value is decided to represent a signal collision since in the case of a plurality of burst signals arriving, the mean level of the receiving burst signals becomes higher than that in the case of only one burst signal being received, as disclosed in Japanese Patent "Kokai" (Publication) No. 159036/83 published on Sept. 28, 1983. This system is, however, defective in that variations in transmission line loss between transmitting and receiving ends, which are caused by different fiber lengths and numbers of connectors used between various transmitting and receiving ends, must be corrected by a fixed attenuator or the like, or that the decision level for detecting a signal collision has to be altered according to the variations in the transmission line loss. Moreover, there has also been proposed a system in which the mean level of optical burst signals is detected by a star coupler and when the detected level exceeds a predetermined value, a signal collision is decided to have occurred, as described in U.S. application Ser. No. 326869 filed on Dec. 3, 1981, now U.S. Pat. No. 4,531,238. In this case, an optoelectric transducer, a smoothing circuit and a level detector are provided in the star coupler to make it complex. This is not preferable since the star coupler must be of high reliability. Furthermore, there is such a system in which a transmission signal and a reception signal are exclusive-ORed at each terminal to detect a signal collision by noncoincidence between them, as described in the aforesaid literature on the Ethernet, though this system is not for the optical burst signal transmission. In this case, the transmitted signal and the received signal must be phase-adjusted so that their collision may be detected correctly.

Besides, for example, in the aforementioned "Ethernet", a signal is transmitted after being converted into a Manchester code, by which the timing component is increased and the DC component of the signal is made substantially constant without sustaining the same code long. In the past, however, the original code has been regenerated directly from the received Manchester coded signal at the receiving side.

SUMMARY OF THE INVENTION

It is therefore an object of the present invention to provide a burst signal receiving apparatus which employs an AC-coupling amplifier but is stable in operation and inexpensive and in which the transient response time in the reception of a burst signal is short and the SN ratio is not degraded.

Another object of the present invention is to provide a burst signal receiving apparatus which permits a rapid and definite detection of a signal collision even if colliding signals are very low in level.

Yet another object of the present invention is to provide a burst signal receiving apparatus which employs an AC-coupling amplifier but is stable in operation, inexpensive, short in the transient response time in the reception of a burst signal and free from degradation of the SN ratio and ensures a rapid and definite detection of a signal collision even if colliding signals are very weak.

In accordance with an aspect of the present invention, the invention is directed to an apparatus for receiving a burst signal consisting of a Manchester code train, or a burst signal intensity-modulated by a signal obtained by Manchester code converting each code of an input signal into two codes. The received burst signal is converted into an AC signal by a partial response conversion "PR(1, −1)", i.e. a sort of bipolar conversion, in a partial response circuit, by which a DC component is removed. Since the removal of the DC component takes place in such a short time as is a little over twice the input signal pulse width, it is possible to reduce the transient response time which starts with the arrival of the burst signal. The signal thus converted into an AC signal is amplified by an AC-coupling amplifier. From the burst signal is generated by clock generating means a clock signal corresponding to the timing of the latter one of the Manchester-coded pair codes. At the timing of this clock signal the output of the AC-coupling amplifier is decided by a binary decision circuit to provide a binary code. The clock generating means generates a timing signal of a frequency equal to the clock frequency of the Manchester-coded signal directly from the received burst signal, or from the AC signal obtained by the partial response conversion of the received burst signal. The timing signal thus obtained is frequency divided by a ½-frequency divider down to half the frequency, yielding a clock signal. From the decided output of the binary decision circuit, the asynchronism detecting means detects asynchronism between the code of the received burst signal and the clock signal, i.e. the state in which the clock signal is not coincident with the timing corresponding to the latter one of the Manchester-coded pair codes. By this detected output, the output of the ½-frequency divider is phase-inverted into synchronism with the received burst signal.

In accordance with another aspect of the present invention, the received burst signal is subjected to a partial response conversion "PR(1, −1)" by the partial response circuit. From the AC signal obtained by the partial response conversion, or from the received burst signal, there is derived a timing signal of the same frequency as the clock frequency of the Manchester-coded signal.

The output of the partial response circuit is decided by the timing signal at the timing of each of the Manchester-coded pair codes in the binary decision circuit which has a decision level slightly apart from zero. The decision output is provided to a coding rule violation detector, by which a coding rule violation (CRV) in a plurality of successive decided output codes is detected as an abnormality of the received signal, that is, as asynchronism or a signal collision. This coding rule violation occurs in the following manner: The eye pattern of the signal obtained by the partial response conversion, at the timing corresponding to the former one of the Manchester-coded pair codes, is ternary. The decision circuit has a decision level slightly apart from zero, and hence readily generates decision errors even when colliding signals of low levels overlap the zero portion of the ternary eye pattern. As a result of this, a coding rule violation is detected, by which a signal collision is sensed. This coding rule violation also occurs when the clock signal is in the asynchronous state. The decided output of the binary decision circuit is provided to a second decision circuit, in which it is decided by the clock signal, which is obtained by frequency dividing the timing signal down to half the frequency, at the timing corresponding to the latter one of the Manchester-coded pair codes. At the beginning of the burst signal reception, the detection of the coding rule violation is decided as asynchronism, and the phase of the clock signal is inverted to set up synchronism. The burst signal receiving apparatus of the present invention is applied to an optical burst signal, electrical burst signal and an electromagnetic wave signal.

BRIEF DESCRIPTION OF THE DRAWINGS

FIG. 1 is a block diagram showing a conventional optical burst receiving apparatus;

FIGS. 2A to 2C are diagrams showing waveforms occurring at respective parts of the optical burst receiving apparatus shown in FIG. 1;

FIG. 3 is a diagram showing an eye pattern (a winking pattern) of a decision circuit input;

FIG. 6 is a diagram showing various code patterns which may appear in the block diagram shown in FIG. 4;

DESCRIPTION OF THE PREFERRED EMBODIMENTS

Figure 4:
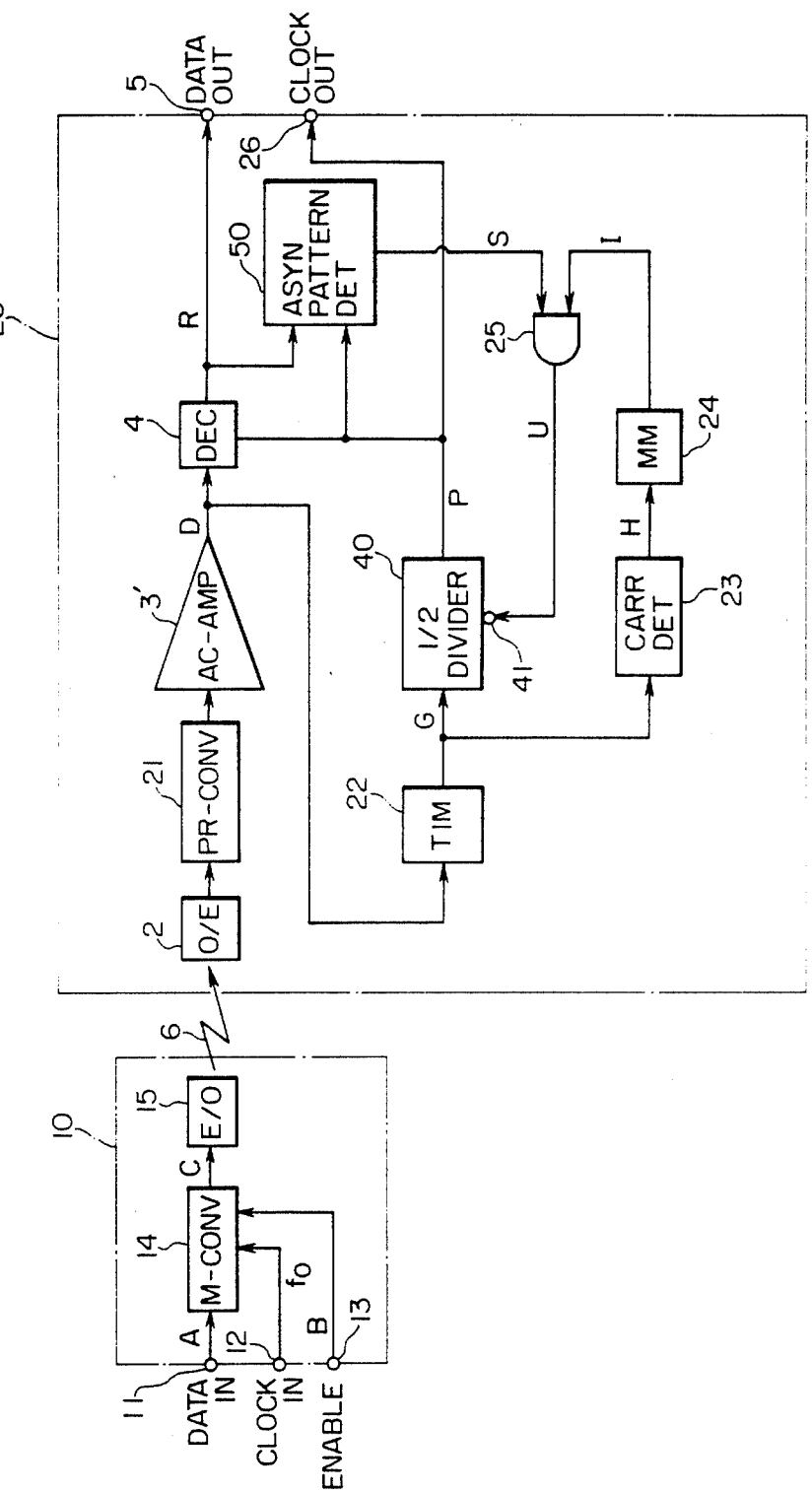
FIG. 4 is a block diagram illustrating a first embodiment of the present invention.

To facilitate a better understanding of the present invention, a description will be given first of problems of a burst signal receiving apparatus in connection with an optical burst signal receiving apparatus. FIG. 1 illustrates a conventional intensity-modulated optical burst signal receiving apparatus. A received optical burst signal 1 is converted by an optoelectric transducer 2 into an electrical signal, which is amplified by an amplifier 3 and then decided by a decision circuit 4, thereafter being provided at a received signal output terminal 5.

FIG. 2 shows signal waveforms which occur at respective parts of the apparatus depicted in FIG. 1. FIG. 2A shows the received optical burst signal 1, FIG. 2B the output from the amplifier 3 in the case where it is of a DC-coupling amplification type and FIG. 2C the output from the amplifier 3 in the case where it is of an AC-coupling amplification type. As illustrated in FIG. 2A, the intensity-modulated received optical burst signal 1 has no negative component. Accordingly, in the case of employing the amplifier 3 capable of amplifying a DC component as well as an AC component, no variations develop in the DC level of the input signal to the decision 4, as shown in FIG. 2B, so that an optimal decision level of the decision circuit 4 is constant, as indicated by the broken line $l_{s1}$. However, since the amplifier 3 is required to be of a high gain and to perform amplification over a wide band, it is difficult to use a DC-coupling amplifier in practice in terms of stability and from the economical point of view; therefore, an AC-coupling amplifier is employed as the amplifier 3. In this case, as shown in FIG. 2C, there is produced in the output of the AC-coupling amplifier, by DC cutoff, a transient response to the electrical signal converted from the received optical burst signal 1, resulting in the optimal decision level of the decision circuit 4 undergoing such variations as indicated by the broken line $l_{s2}$. Usually the decision level of the decision circuit 4 is fixed at a constant value. In case the decision level is set to a level which becomes optimal in the steady state, since this level approaches the zero level, a decision error occurs in the beginning part of the received optical burst signal, making a normal decision of that part impossible. Further, the transient response time region can be reduced by raising the low-frequency range cutoff frequency of the AC-coupling amplifier 3, but the raise of the cutoff frequency leads to a waveform distortion in the output of the amplifier 3 in the steady state, by which an eye pattern is degraded, resulting in impaired receiver sensitivity.

On the other hand, when the conventional receiving apparatus shown in FIG. 1 receives two or more optical burst signals at the same time (a collision of optical signals), if the level difference between the optical burst signals exceed a certain value, no error is made in the decision of a digital signal of the optical burst signal of the higher level. This can be regarded as an advantage of the digital signal transmission, but information indicating the collision of the optical signals cannot be obtained and it is impossible to employ the CSMA/CD control procedure which is one of the aforesaid packet transmission procedures. That is to say, according to this transmission procedure, when a signal collision occurs, for example, light transmission from all transmission sources of the transmission system is stopped and signals are retransmitted at appropriate different time intervals. When the function of one of the transmission sources has lowered to decrease its transmission output, however, there is entailed the disadvantage that no signal collision is detected, as mentioned above, and information from the transmission source of the lowered level is not received by the receiving apparatus.

The present invention is directed to a receiving apparatus for a burst signal which is intensity-modulated by a signal obtained by Manchester-code converting each code of an input signal into two codes, i.e. a pair of codes. According to the present invention, the received burst signal is subjected to a partial response conversion "PR(1, −1)" in a partial response circuit to convert into an AC signal, that is, a signal with no DC component.

FIG. 3 shows an output eye pattern of the partial response circuit, which is measured after being passed through a low-pass filter having a cutoff frequency 0.7 times a transmission clock frequency $2f_0$. This eye pattern is what is called a winking pattern in which the part $P_1$ corresponding to the former one of the Manchester-coded pair codes is ternary and the part $P_2$ corresponding to the latter code is binary. The regeneration of transmitted information from the output eye pattern shown in FIG. 3 is accomplished by deciding the above-said partial response circuit output with an ordinary binary decision circuit at the timing ($t_D$ in FIG. 3) corresponding to the latter one of the Manchester-coded pair codes.

On the other hand, by deciding the partial response circuit output with the binary decision circuit, which has its decision level slightly shifted from zero, at the timing ($t_C$ in FIG. 3) corresponding to the former one of the Manchester-coded pair codes, it is possible to detect from the output abnormalities of received optical burst signals, that is, an abnormality in a synchronization pattern and an abnormality caused by a signal collision. Namely, at the timing $t_C$ corresponding to the former code of the Manchester-coded pair codes, there occasionally arises the situation where the partial response circuit output becomes zero level, as is evident from FIG. 3. Accordingly, even when a signal of a low level collides with a signal of a higher level, if the colliding signals overlap the zero-level part, the level is greatly affected and readily exceeds the decision level slightly shifted from the zero level, leading to a coding rule violation (CRv) by the decided output of this part. By monitoring a CRV for a code train consisting of the decided output of the part corresponding to the ternary eye pattern and the decided outputs of the parts corresponding to the adjacent binary eye pattern, an abnormality in the synchronization pattern and a signal collision can be detected.

As will be appreciated from the above description, it is the premise of the receiving apparatus of the present invention that at the transmitting side transmission data is converted into a Manchester code and a carrier such as optical or electromagnetic wave is intensity-modulated by the Manchester code data and transmitted as a burst signal.

<First Embodiment>

FIG. 4 illustrates an embodiment of the present invention as being applied to an optical communication system. A transmission signal A comprising a preamble PRE and data DATA (for instance, FIG. 5A) is supplied to a transmission data input terminal 11 of an optical burst signal transmitter 10 and fed to a Manchester code converter 14. A clock signal ($f_0$), which is synchronized with the transmission signal A, is also provided to the Manchester code converter 14 from a clock input terminal 12. The code converter 14 yields an output "10" for an input '0' and an output "01" for an input '1' in conformity to such a Manchester code conversion rule as shown in FIG. 6. If an input B at an enable signal input terminal 13 goes high at a time point $t_1$, as shown in FIG. 5B, the output C is derived from the Manchester code converter 14 (FIG. 5C) in a burst-like form during the input B assumes high level. An optical signal is intensity-modulated by the burst-like signal in an electro-optic transducer 15 to produce an optical burst signal 6, which is transmitted from an optical burst signal transmitter 10.

The optical burst signal 6 is converted into an electrical signal by the optoelectric transducer 2 of an optical burst signal receiving apparatus 20 embodying the present invention. The electrical signal output is converted by a partial response circuit 21 into an AC signal having no DC component, a corresponding D appearing at the output of AC-amplifier 3' as shown in FIG. 5D. The influence of a band restriction on the signal D is produced by the optoelectric transducer 2 and an AC-coupling amplifier which is cascade-connected thereto, though not illustrated. The partial response circuit 21 performs what is called a PR(1, −1) conversion, in which, Manchester-coded inputs "1" and "0" are converted into two-code outputs "1, −1" and "0, 0", respectively, and each of the thus converted two-code outputs is overlapped with adjacent ones of them in such a manner that the second code of the previous output is superimposed on the first code of the succeeding output. The partial response circuit 21 can be formed by an analog circuit, which possesses a function of summing a polarity-inverted input delayed by one bit of the Manchester-coded input and an undelayed input and exhibits a sort of filter characteristic of eliminating a DC component. With such an arrangement, for example, inputs "1", "0" are converted to "1, −1" and "0, 0" respectively, but since the second code "−1" of the former and the first code "0" of the latter are superimposed on each other, the resulting output is "1, −1, 0". In the case of a continuous data, the first code "1" of the former converted output will have a value X dependent on the immediately preceding code. Now, letting the output dependent on the preceding code, a positive amplitude output and a negative amplitude output being represented by X, + and −, respectively, a train of Manchester codes "1010" is converted by the partial response circuit 21 into "X-+-", as shown in FIG. 6. The corresponding output waveform is such as shown in the horizontal column of decision circuit 4 input patterns in FIG. 6.

As described above, the partial response conversion is a sort of bipolar conversion. Even if the signal subjected to the partial response conversion is amplified by the AC-coupling amplifier 3' in FIG. 4, since it has no DC component, there will not be caused such a variation in the optimal decision level as shown in FIG. 2C, permitting a high-speed burst response. The amplified output signal D of the AC-coupling amplifier 3' is applied to the decision circuit 4 and a timing extractor 22. The timing extractor 22 extracts a timing signal G (FIG. 5G) which has a frequency $2f_0$ twice higher than the information transmitting clock frequency $f_0$. The timing signal G is provided to a ½-frequency divider (a clock generator) 40 having a phase inverting input terminal 41 and to a carrier detector 23 which serves as a reception detector.

In FIG. 4, the carrier detector 23 detects a carrier by the presence of the component of the frequency $2f_0$ twice higher than the information transmitting clock frequency $f_0$ in the input signal, that is, it detects the input to an optical burst signal receiving apparatus 20. The detected output H from the carrier detector 23 rises substantially at the same time as does a first pulse of the timing signal G, as shown in FIG. 5H, which is applied to a monostable multivibrator 24. As a result, the monostable multivibrator 24 generates a high-level output I for a fixed period of time $T_1$, and the output I (FIG. 5I) is supplied to an AND gate 25 to open it for the time $T_1$.

Figure 5:
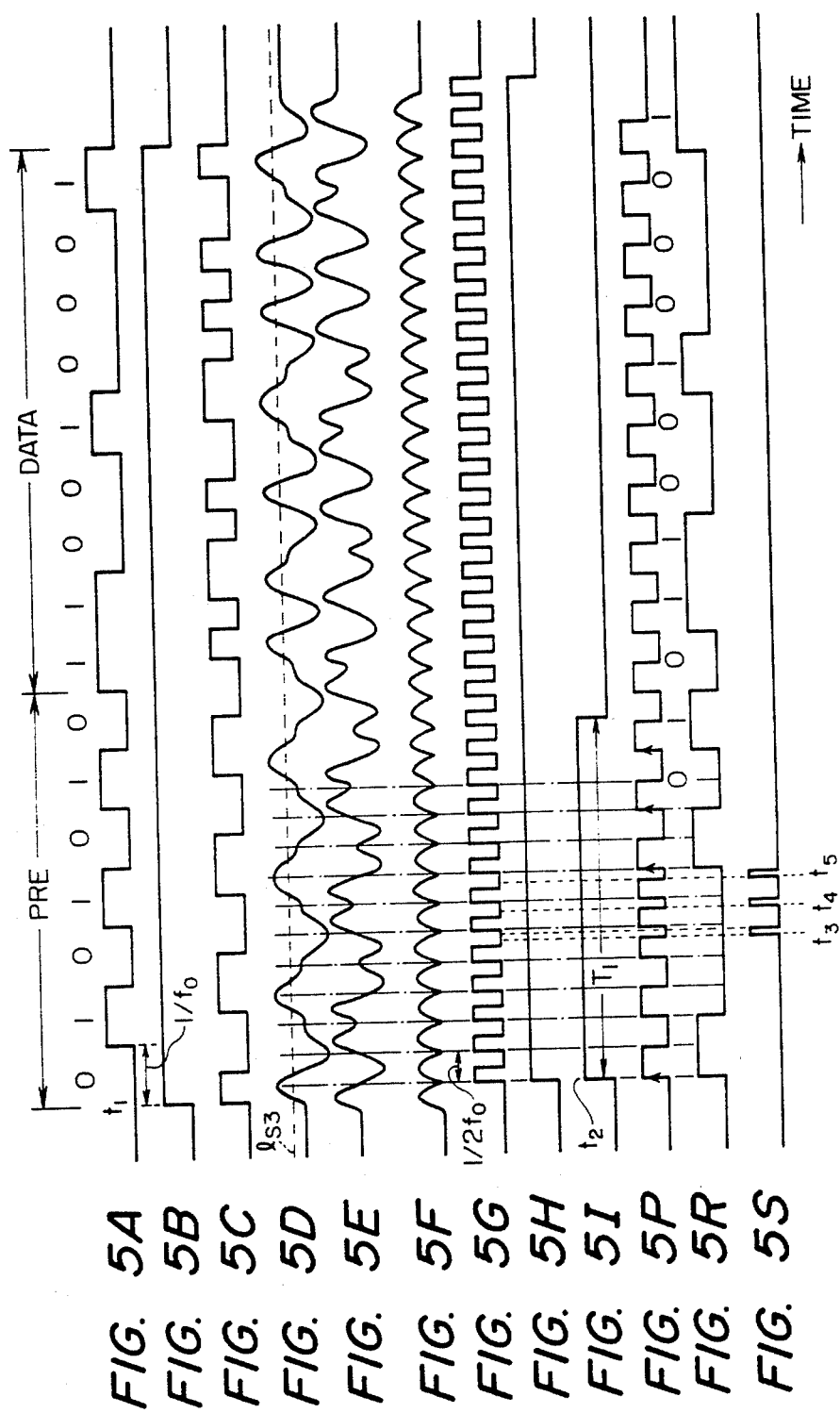
FIGS. 5A to 5I, 5P, 5R and 5S are diagrams showing, by way of example, waveforms occurring at respective parts of the embodiment illustrated in FIG. 4.

On the other hand, the output of the AC-coupling amplifier 3' is decided by the binary decision circuit 4 at the rise-up timing of the output clock P (FIG. 5P) of the ½-frequency divider (a clock generator) 40. The clock P is of the same frequency as that $f_0$ of the information transmitting clock. The internal logic state of the ½-frequency divider 40 which starts its operation upon arrival of a signal to the receiving apparatus is determined in terms of probability, so that it is determined in terms of probability whether the output P is 0-phase or π-phase. Now, suppose that an initial phase of the clock P at the time of deciding first data is as shown in FIG. 5P. Let the decision circuit output obtained by deciding the output D of the AC-coupling amplifier 3' with the clock P in the decision circuit 4 be represented by R. The decided output R (FIG. 5R) is an NRZ code and supplied to the received signal output terminal 5 and an asynchronous pattern detector 50. When a decision level and a decision ambiguity width of the decision circuit 4 are represented by $l_{s3}$ and $\epsilon$, respectively, the signal input to the decision circuit 4, the level of which is smaller than $(l_{s3}+½\epsilon)$ and greater than $(l_{s3}-½\epsilon)$, is not always decided correctly. Therefore, the decision level $l_{s3}$ of the decision circuit 4 is selected to be a value which is greater than $+½\epsilon$ or smaller than $-½\epsilon$ but close to zero. FIG. 5 illustrates an example in which the threshold level of the decision circuit is selected to be on the + side, and the threshold level $l_{s3}$ is indicated by the broken line in an overlapping relation to the signal D.

The asynchronous pattern detector 50 samples the decided output R on positive-going edges of the clock P, and in this case, if a specific synchronous pattern such as alternating levels of "0" and "1" seen in a preamble PRE shown in FIG. 5A, for example, is not obtained in the output R of the decision circuit 4, the detector 50 will generate an output S (FIG. 5S). In the example of FIG. 5, the output S is produced at times $t_3$, $t_4$ and $t_5$. The output S is applied to the AND gate 25 which has been opened by the signal I, and its output U is provided to the phase inverting input terminal 41 of the ½-frequency divider (a clock generator) 40, by which the clock P is phaseinverted, causing the decision circuit 4 to decide the input thereto at the timing of the latter code of the Manchestercoded pair codes, that is, at the timing of the binary portion $P_2$ of the eye pattern (FIG. 3). The output S produced after the time period $T_1$ is prevented from passing through the AND gate 25 by the signal I. Consequently, after synchronization has been once established, the synchronization will not be destroyed. The time period $T_1$ is selected equal to or less than the time period of the preamble PRE that is added at the head of a transmission signal for establishing synchronization in ordinary burst transmission.

<Specific Example of Each Part>

Next, a description will be given of a specific example of the arrangement of each of the binary decision circuit 4, the partial response circuit 21, the timing extractor 22, the carrier detector 23, the ½-frequency divider (a clock generator) 40 provided with the phase inverting input terminal 41 and the asynchronous pattern detector 50.

Figure 7:
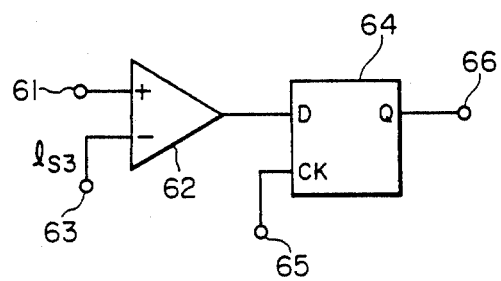
FIG. 7 is a block diagram illustrating an example of a binary decision circuit 4.

In the binary decision circuit 4, for example, as shown in FIG. 7, the output of the AC-coupling amplifier 3' is supplied from a terminal 61 to the non-inverting input side of a comparator 62, and the threshold level $l_{s3}$ is input via a terminal 63 to the inverting input side of the comparator 62. The comparison result by the comparator 62 is provided to a data terminal D of a flip-flop 64. The clock signal P from the ½-frequency divider 40 is applied via a terminal 65 to a clock terminal CK of the flip-flop 64, and the output of the comparator 62 is input into the flip-flop 64 at the positive-going edge of the clock signal. The output of the flip-flop 64 is provided as the decided output at a terminal 66.

Figure 8:
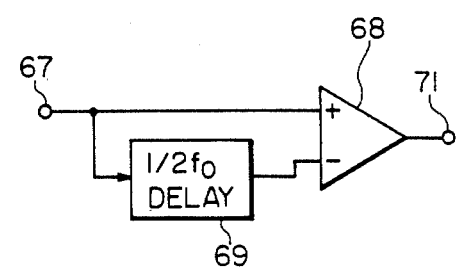
FIG. 8 is a block diagram showing an example of a partial response circuit 21.

The partial response circuit 21 has such an arrangement, for instance, as shown in FIG. 8, in which an input to be subjected to the partial response conversion is provided to the non-inverting input side of a differential circuit 68 and a delay circuit 69 from a terminal 67. The delay circuit 69 delays the input thereto by one clock period $\frac{1}{2}f_0$ of the Manchester-coded codes and supplies the delayed output to the inverting input side of the differential circuit 68. From the differential circuit 68 is derived a partial response PR (1, −1) converted output at a terminal 71.

Figure 9:
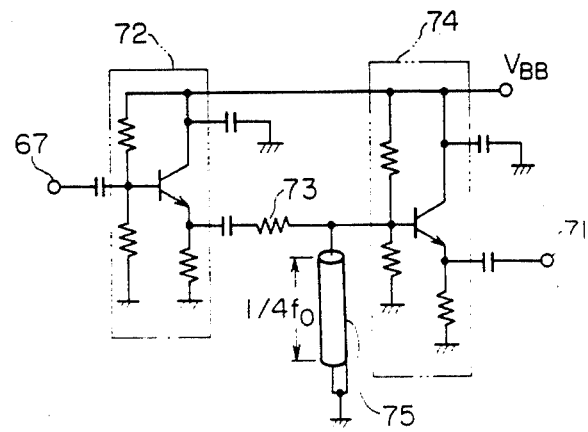
FIG. 9 is a connection diagram showing another example of the partial response circuit 21.

The partial response circuit 21 may also be arranged as illustrated in FIG. 9. The input from the terminal 67 is provided to an emitter follower circuit 72, the output of which is applied via a resistor 73 to an emitter follower circuit 74. The junction of the resistor 73 and the emitter follower circuit 74 is grounded via a coaxial cable 75. The grounding side of the coaxial cable 75 has its internal conductor and external conductor interconnected. The impedance looking into the junction of the resistor 73 and the emitter follower circuit 74 from the coaxial cable 75, is made to be equal to the characteristic impedance of the coaxial cable 75. The length of the coaxial cable 75 is selected so that the propagation time therein may be $\frac{1}{4}f_0$. Accordingly, the output of the emitter follower circuit 72 is branched to the emitter follower circuit 74 and the coaxial cable 75. The signal branched to the coaxial cable 75 is reflected at the grounding end and, at the same time, polarityinverted and, after the lapse of time $\frac{1}{2}f_0$, it is superimposed on the signal from the emitter follower circuit 72 and provided to the emitter follower circuit 74. The partial response conversion output from the emitter follower circuit 74 is supplied to the terminal 71.

Various other partial response circuits can also be employed.

Figure 10:
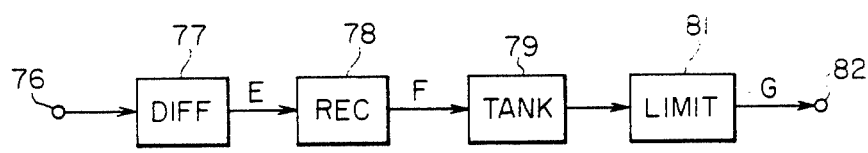
FIG. 10 is a block diagram illustrating an example of a timing extractor 22.

The timing extractor 22 can be a differential full-wave rectifier (or difference full-wave rectifier) heretofore widely used. As illustrated in FIG. 10, the input signal D from a terminal 76 is differentiated (or differenced) by a differential (or difference) circuit 7, and the output signal E thereof becomes such as shown in FIG. 5E. The signal E is full-wave-rectified by a full-wave rectifier 78, obtaining a signal F, the fundamental frequency of which is a frequency $2f_0$ twice higher than the information transmitting clock frequency $f_0$, as depicted in FIG. 5F. The signal F thus obtained is sequentially applied to a tank circuit 79 which is tuned to the frequency $2f_0$ and an amplitude limiter 81, thereby providing at a terminal 82 the timing signal G shown in FIG. 5G. Since there is no appreciable difference between the power spectrum of the Manchester code before and after subjected to the partial response conversion, even if the input signal to the timing extractor 22 is derived from the output of the optoelectric transducer 2, no remarkable deficiency will be produced in the timing extraction characteristic. In this case, the differentiating or differencing operation can be omitted. When employing an amplitude limiting amplifier as the AC-coupling amplifier 3' so that the dynamic range of the decision circuit 4 may be small, the power spectrum of the output from the amplitude limiting amplifier undergoes substantial variations due to its nonlinear characteristic, and if this output is used as the input signal to the timing extractor 22, then the timing extraction characteristic will be degraded. Therefore, in the case of employing the amplitude limiting amplifier the input signal to the timing extractor 22 should be obtained from the stage preceding the amplitude limiting amplifier.

As the carrier detector 23, use can be made of a retriggerable monostable multivibrator which outputs pulses of a width somewhat longer than $1/f_0$, or such an arrangement that rectifies and smooths the timing signal G and activates a Schmitt trigger by the smoothed output, or such an arrangement that exclusive-ORs the timing signal G and a signal obtained by shifting the signal G by $\frac{1}{2}f_0$. There are cases of adopting such an arrangement that employs, as the input signal to the carrier detector 23, the output from the decision circuit 4, the optoelectric transducer 2 or the AC-coupling amplifier 3'.

As the ½-frequency divider (clock generator) 40 provided with the phase inverting input terminal 41, there are considered the following three arrangements:

(1) Arrangement in which a clock signal of a correct phase is selected by the phase inverting input signal S from ½-frequency divided clock outputs of 0 and $\pi$ phases.

Figure 11:
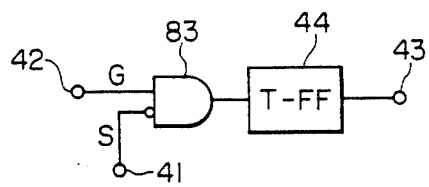
FIG. 11 is a logic circuit diagram showing an example of a ½-frequency divider 40.

(2) As shown in FIG. 11, one of the pulses of the input timing signal G from a terminal 42 is removed by an inhibit gate 83 in synchronism with the input of the phase inverting signal S to the terminal 41, and the output of the inhibit gate 83 is frequency divided by a T flip-flop 44 down to half the input frequency thereto to produce an output at terminal 43.

Figure 12:
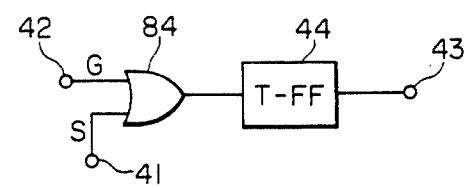
FIG. 12 is a logic circuit diagram showing another example of the ½-frequency divider 40.

(3) As illustrated in FIG. 12, the input timing signal G and the phase inverting signal S (which has a pulse width twice greater than that of the input timing signal G) are ORed by an OR circuit 84 in synchronism with the input of the phase inverting signal S to convert two clock pulses of the timing signal G into a single wide clock, and the output of the OR circuit 84 is provided to the T flip-flop 44.

Figure 13:
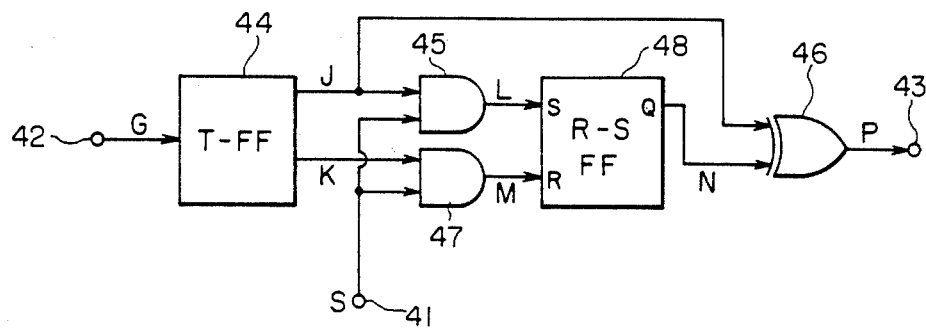
FIG. 13 is a logic circuit diagram illustrating still another specific example of the ½-frequency divider.

FIG. 13 illustrates the arrangement (1). The timing signal G is input via the terminal 42 to a ½-frequency divider 44 which is formed by a T flip-flop. One output J from the flip-flop 44 has the same frequency as that $f_0$ of the information transmitting clock and is applied to an AND gate 45 and an exclusive OR (EXOR) gate 46. The other output K from the flip-flop 44 is of the same frequency as the output J but different therefrom in phase by $\pi$ and this signal is applied to an AND gate 47. The output L from the AND gate 45 is provided to a set input terminal S of an R-S flip-flop 48 and the output M from the AND gate 47 to a reset input terminal R of the R-S flip-flop 48. The Q output N from the R-S flip-flop 48 is input to a terminal of the EXOR gate 46 which is different from the input terminal thereof to which the signal J is applied. The phase inverting signal S is provided to the AND gates 45 and 47.

Figure 14:
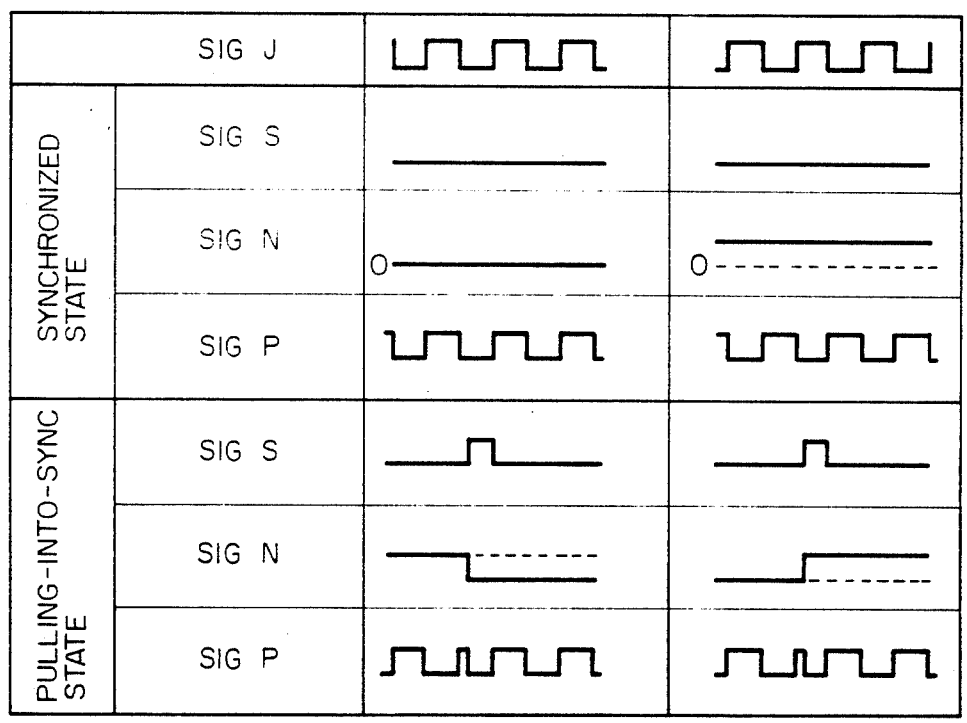
FIG. 14 is a diagram showing, by way of example, waveforms occurring at respective parts in the circuit of FIG. 13, for assistance in explaining its operation.

The internal logic state of the ½-frequency divider 40 with which it starts its operation upon arrival of a burst signal at the receiving apparatus 20, is determined in terms of probability, and in the case of FIG. 13 there are four possible cases as illustrated in FIG. 14: in the first case the signal P is in phase (0-phase) with the signal J and is in synchronism with the binary portions $P_2$ of the output signal D (FIG. 5D) from the AC-coupling amplifier 3'; in the second case the signal P is out of phase ($\pi$-phase) with the signal J and is not in synchronism with the binary portions $P_2$ of the signal D; in the third case the signal P is out of phase ($\pi$-phase) with the signal J and is in synchronism with the binary portions $P_2$ of the signal D; and in the fourth case the signal P is in phase with the signal J and is not in synchronism with the binary portions $P_2$ of the signal D. In the second case of the signal P being found not in synchronism with the binary portions $P_2$ of the signal D at the time $t_1$, the asynchronous pattern detector 50 detects the asynchronism after the rise of the signal P and produces the phase inverting signal S, which is applied as a reset signal M through the AND gate 47 to reset the flip-flop 8. As a result, the signal N of the Q output of the flip-flop 48 becomes low level to invert the signal P, thus pulling the signal P into synchronization with the binary portions $P_2$ of the signal D. In the fourth case, the phase inverting signal S is also produced after the rise of the signal P and applied as a set signal L through the AND gate 45 to the flip-flop 48 to set the signal N of the Q output to high level, thus inverting the signal P to establish the synchronization. In the first and third cases where the signal J happens to be in synchronism with the binary portions $P_2$ from the initial logic state with which the ½-frequency divider 40 starts to operate, the signal S will not be produced and no phase inverting operation will take place.

Figure 15:
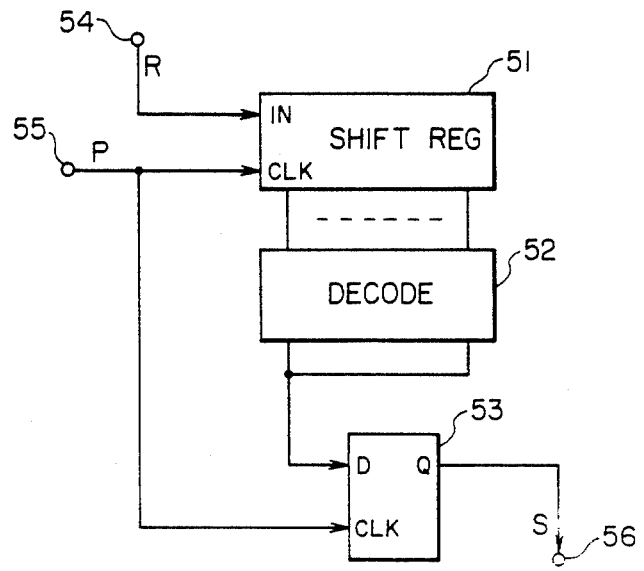
FIG. 15 is a block diagram illustrating specific examples of an asynchronous pattern detector and coding rule violation detector.
Figure 16:
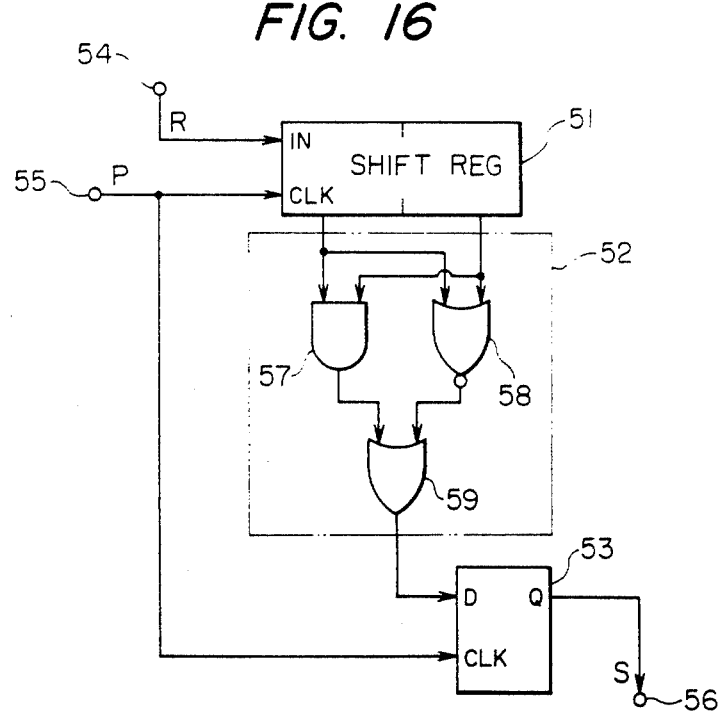
FIG. 16 is a logic circuit diagram illustrating a more specific example of the asynchronous pattern detector.

The asynchronous pattern detector 50 can be formed by a shift register 51, a decoder 52 for decoding the contents of the shift register 51 and a flip-flop 53 for waveform shaping a synchronization abnormality signal S (a phase inverting signal S) from the decoder 52 and for establishing synchronization between the signal S and the clock signal P, as illustrated in FIG. 15. In the example shown in FIG. 5A, since the preamble PRE in which the 0 and the 1 state alternate with each other is used as the synchronous pattern, a code "11" or "00" detected by the decoder 52 is representative of an abnormality in the synchronous pattern. FIG. 16 illustrates a specific example of the asynchronous pattern detector 50 for use in this case. The shift register 51 is a two-bit shift register 51 and the decoder 52 is composed of an AND gate 57, a NOR gate 58 both supplied with the outputs of two shift stages of the shift register 51 and an OR gate 59 supplied with the outputs from the gates 57 and 58. The abnormal synchronous pattern of the code "11" is detected by the AND gate 57 and the abnormal synchronous pattern of the code "00" by the NOR gate 58. As the decoder 52 can also be used an IC for a decoder. After having been phaseinverted by the output S, the clock signal P is always in synchronism with the binary portion $P_2$ which is the latter half of the winking pattern shown in FIG. 3, and the transmitted information can be obtained by conducting binary decision at the binary portions $P_2$. Thus the degradation of decision can be reduced and the decision circuit 4 may be a simple binary level deciding circuit.

While in the example of FIG. 4 the AND gate 25 is connected to the output side of the asynchronous pattern detector 50, it is also possible to connect the AND gate 25 to the input side of the asynchronous pattern detector 50, to take AND of the signals R and I and to provide the ANDed output to the detector 50.

<Second Embodiment>

Figure 17:
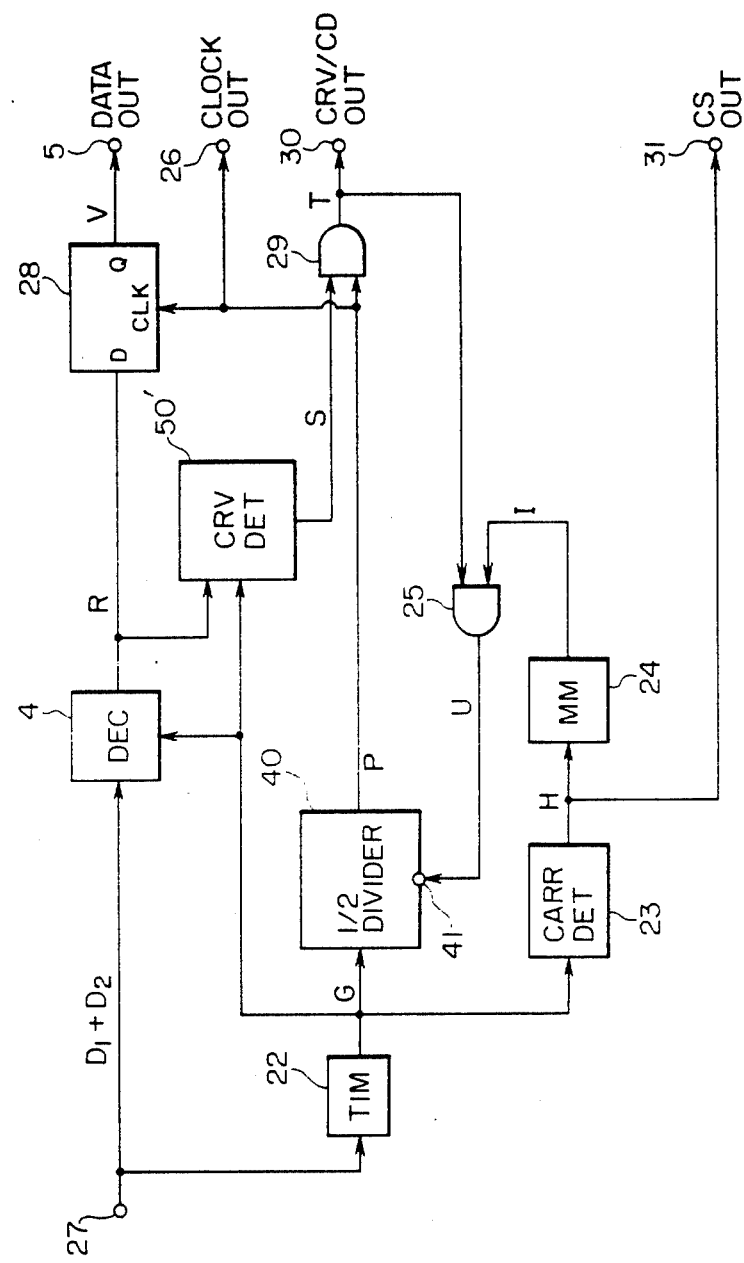
FIG. 17 is a block diagram illustrating the principal part of a second embodiment of the present invention.
Figure 18:
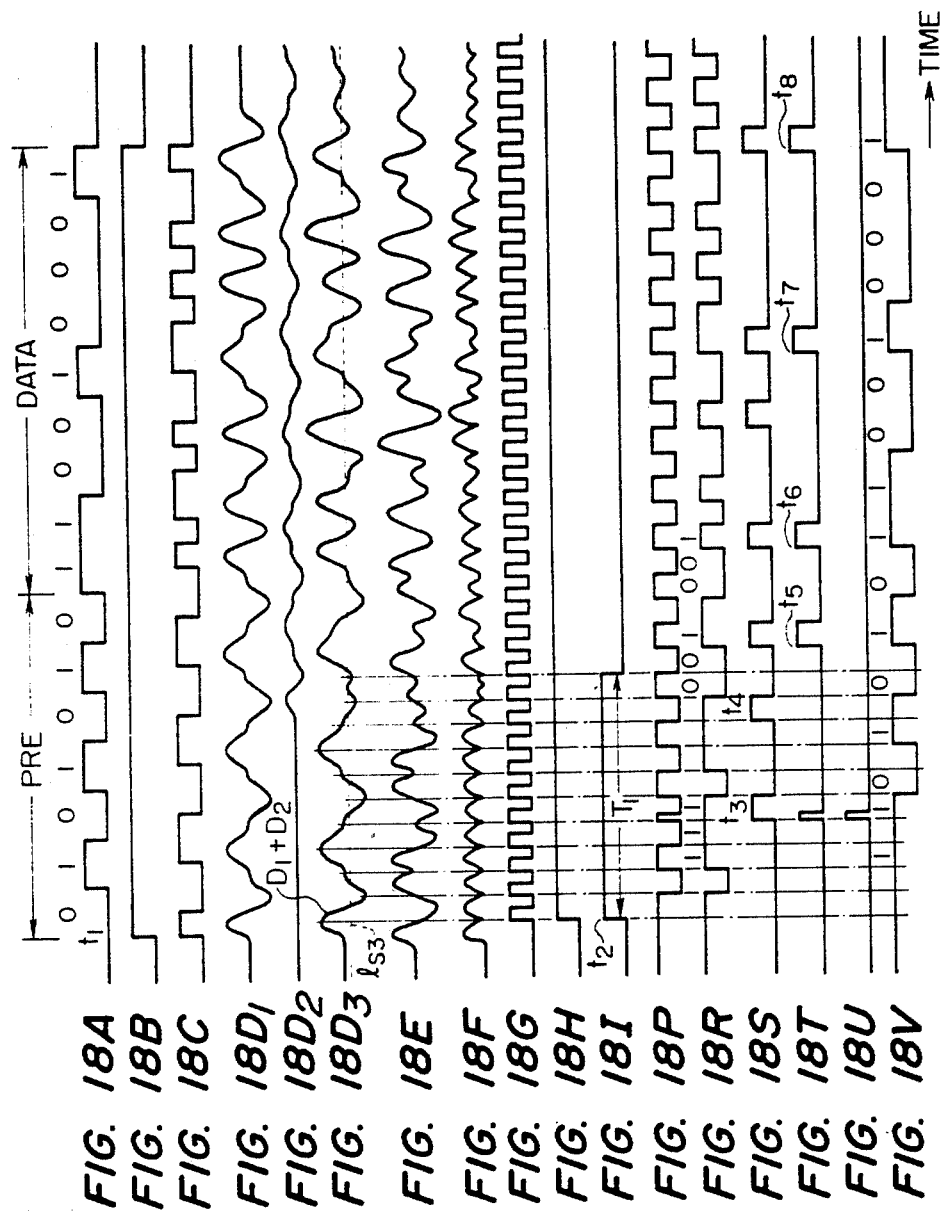
FIGS. 18A to 18I, 18P, and 18K to 18V are diagrams showing, by way of example, waveforms occurring at respective parts in FIG. 17.

FIG. 17 illustrates another embodiment of the present invention in which the stages succeeding the AC-coupling amplifier 3' in the embodiment shown in FIG. 4 are modified to equip the optical burst signal receiving apparatus with a function for detecting a collision of an optical burst signal. The parts corresponding to those in FIG. 4 are identified by the same reference numerals. The arrangement of the optoelectric transducer, the partial response converter and the AC-coupling amplifier is the same as that shown in FIG. 4, and, therefore, is not shown in FIG. 17. FIG. 18 shows examples of operating waveforms at respective parts in FIG. 17, the parts corresponding to those in FIG. 5 being indicated by the same reference numerals and characters. Letting the outputs from the AC-coupling amplifier 3' in the case of optical burst signals having arrived at the optical burst signal receiving apparatus 20 from two nodes with a small time difference therebetween (in the case of an optical signal collision) be represented by $D_1$ and $D_2$ in FIG. 18, the input to the input terminal 27 in FIG. 17 is $D_1 + D_2$. This input signal is applied to the decision circuit 4 and the timing extractor 22. The timing extractor 22 outputs the timing signal G of the frequency $2f_0$ twice higher than the information transmitting clock frequency in the same manner as described previously. The timing signal G is applied to the ½-frequency divider (a clock generator) 40 with the phase inverting signal input terminal 41, the carrier detector 23, the decision circuit 4 and a coding rule violation detector 50'.

The carrier detector 23 detects the carrier (or the input to the optical burst signals receiving apparatus) in accordance with the presence of the timing signal G of the frequency $2f_0$ twice higher than the information transmitting clock frequency as is the case with the first embodiment. The detected output H rises substantially simultaneously with the rise of a first pulse of the timing signal G, as shown in FIGS. 18G, 18H, and the output H is provided to the monostable multivibrator 24. In consequence, the monostable multivibrator 24 yields the high-level output I for the fixed period of time $T_1$, and the output I is applied to the AND gate 25 to open it, permitting the phase pulling-in operation. The decision circuit 4 decides the input signal $D_1 + D_2$ at the time point of the rising of the timing signal G of the frequency $2f_0$. In the example of FIG. 18, the deciding level $l_{s3}$ of the decision circuit 4 is set to a $-\Delta$ which is close to zero but more than $-\frac{1}{2}\epsilon$ apart from the zero (see FIG. 3). The decided output R is provided to a flip-flop 28 serving as a second decision circuit and the coding rule violation detector 50'. The coding rule violation detector 50' samples the decided output R at the rise of the timing signal G and when detecting a coding rule violation, it yields the signal S. This coding rule violation occurs at the time of a synchronization error of the information transmitting clock ($f_0$) or a collision of received signals and, in the example of FIG. 18, it occurs at time points $t_3$, $t_4$, . . . . The coding rule violation (collision) output S must be synchronized with the information transmitting clock P, as will be evident from FIG. 18. Accordingly, the signal S and the clock P are ANDed by an AND gate 29, and a signal T is derived at a coding rule violation output terminal 30. In the above explanation, the $\frac{1}{2}$-frequency divider 40 can be realized by, for example, a resettable T flip-flop having a reset terminal as the phase inverting input terminal and a trigger terminal for receiving the timing signal G.

The signal T is applied to the AND gate 25 as well. The signal T, which is produced in the time period $T_1$ during which the AND gate 25 is opened by the signal I, becomes the signal U, which is provided to the phase inverting signal input terminal 41 of the $\frac{1}{2}$-frequency divider 40, wherein it inverts the phase of the clock P, performing the phase pulling-in operation. The time period $T_1$ is selected equal to or less than the length (time) of a preamble PRE (which is shown to be a pattern in which 0 and 1 alternate with each other in FIG. 18A) which is added to the head of a transmission signal for setting up synchronization in ordinary burst transmission.

Figure 19:
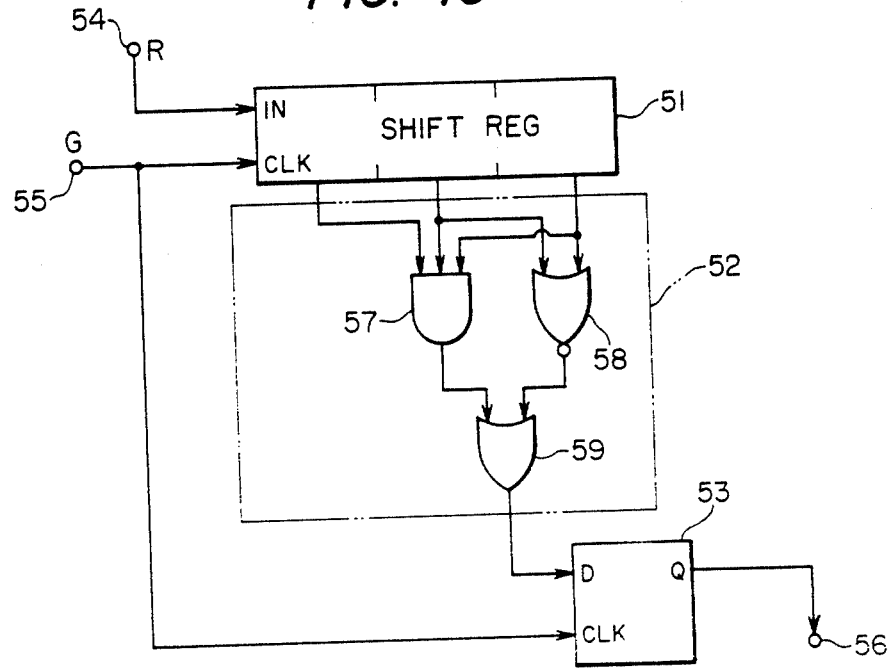
FIGS. 19 and 20 are logic circuit diagrams respectively showing specific examples of a coding rule violation detector 50'.

The decided output R of the decision circuit 4 is decided by the information transmitting clock P in the flip-flop 28, and regenerated data V is provided as an NRZ code to the received signal output terminal 5. By ANDing the signal R and the information transmitting clock P through using an AND gate in place of the flip-flop 28, an RZ output can be obtained as the regenerated data. The specific arrangements of the timing extractor 22, the carrier detector 23 and the $\frac{1}{2}$-frequency divider 40 provided with the phase inverting signal input terminal 41 are exactly the same as described previously in connection with the first embodiment; therefore, no description will be given of them. This embodiment differs from the first one only in that the decision circuit 4 carries out the decision at the timing of the timing signal G instead of the clock P. The coding rule violation detector 50' can also be formed generally by the shift register 51, the decoder 52 and the flip-flop 53 which shapes the waveform of the CRV detected output and synchronizes it with the clock signal, as illustrated in FIG. 15. In this case, however, the shift clock of the shift register 51 is produced by the timing signal G. FIG. 19 illustrates a specific example of the coding rule violation detector 50'. The shift register 51 inputs the signal R decided at the frequency $2f_0$, by the timing signal G and stores the signal R for three codes at all times. Of eight possible combinations of three decided codes which can be obtained in respective stages of the three-stage shift register 51, four combinations which agree with the coding rule and the remaining four combinations which violate coding rule are such as shown in the columns in FIG. 6. Shown in FIG. 6 are two kinds of those combinations mentioned above in the case where the deciding level of the decision circuit 4 is deviated from the zero level by $+\Delta$ or $-\Delta$, as shown in FIG. 3. That is, in the case of using the decision level $-\alpha$ there cannot be such a pattern in which the consecutive two or more of the three bits become 0 or all three bits go to 1. Similarly, in the case of using the decision level $+\Delta$ there cannot be such a pattern in which the consecutive two or more of the three bits become 1 or all three bits go to 0. In other words, in the both cases, those of the three-bit patterns derived by changing the second bit of the three bits which agree with the coding rule are all against the coding rule. The example of FIGS. 18 and 19 show the case in which the decision level of the decision circuit 4 is $-\Delta$. In FIG. 19 the coding rule violation detector 50' is formed by logic circuits so that it yields the signal S upon detecting that the three-bit input from the shift register 51 is "000", "001" or "111". The AND gate 57 is supplied with the outputs from the three stages of the shift register 51 to detect "111", and the NOR gate 58 is supplied with the outputs from the second and third stages of the shift register 51 to detect "00X", where X represents a "1" or "0". In the example of FIG. 18, the three-bit input pattern R of the coding rule violation detector 50' becomes "111" at the time points $t_3$ and $t_4$ and agrees with the pattern of the coding rule violation shown in FIG. 6, thus producing the output S from coding rule violation detector 50'. The pattern R input to the detector 50' at each of the time points $t_5$ and $t_6$, for example, is "001". This also is a violation of the coding rule, and at each of these time points the signal S is produced. Taking AND of the signals P and S by the AND gate 29, the coding rule violation signal T is produced at the time points $t_3$, $t_5$, $t_6$, $t_7$ and $t_8$.

Figure 20:
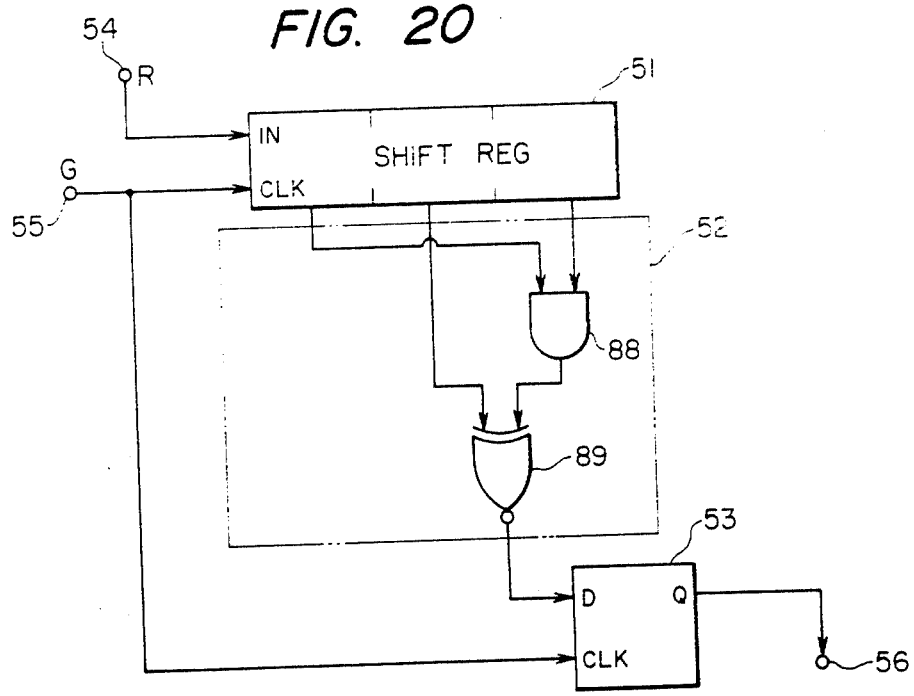

The coding rule violation detector 50' illustrated in FIG. 19 does not detect such a violation of the coding rule that the three bits input to the shift register 51 go to "100". This is intended to achieve a collision detection with high reliability. That is to say, the three-bit pattern "100", which is a CRV, may occur in connection with only a transmitted information pattern "1 0", as depicted in FIG. 6. The input D to the decision circuit 4 in this case is "X+0−" as shown in FIG. 6, however, since this "0" has been produced at the partial response circuit 21 by superimposing "1" and "−1" each other, the resultant analog level of the signal "0" from the partial response circuit 21 may happen to be lower than the decision level $-\Delta$ because of interference resulting from the imperfectness of the partial response conversion and by the influence of the summing of noises accompanying the signals "1" and "−1". In this case the output signal "0" from the partial response circuit 21 will be decided, by the decision circuit 4, to be logic "0", which is an error because in the case of employing the decision level $-\Delta$ the signal "0" input to the decision circuit 4 must be decided to be logic "1". Accordingly, by adopting such a circuit arrangement that does not detect such a coding rule violation that the three-bit input becomes "100", it is possible to eliminate the influences by the imperfect partial response conversion and the noise added to a signal which should become zero-level by above mentioned superposition. This ensures to detect a collision of burst signals, even if they are low-level; thus, highly reliable information can be obtained. It is also possible to detect all of the four patterns when the transmission characteristic affords a margin of such detection, i.e. when a signal can be received with a sufficient SN ratio, and this can be achieved regardless of whether the decision level is positive or negative. A specific example of the coding rule violation detector 50' for use in this case is illustrated in FIG. 20 in connection with the case where the threshold value of the decision circuit 4 is $-\Delta$. The first- and third-stage outputs of the shift register 51 are supplied to an AND circuit 88, and the second-stage output of the shift register 51 and the output of the AND circuit 88 are provided to an exclusive NOR circuit 89. The AND circuit 88 and the exclusive NOR circuit 89 detect each of the cases where the three-bit input from the shift register 51 is "000", "001", "100" and "111", and they provide the detected output to a data terminal D of the flip-flop 53, yielding the signal S. Further, in the event that the output T appears owing to a violation coding rule even after the phase pulling-in operation has been completed, as indicated, for instance, at time points $t_5, t_6, t_7, \ldots$ in FIG. 18T, since it can be considered that the output T is produced by the reception of two or more optical input signals, the output T can be used as a collision detection signal. Also in this case, an error hardly occurs in the received signal output V as described previously in respect of FIG. 4. Moreover, the coding rule violation is likely to occur in the first half (the ternary portion $P_1$ of the eye pattern) of the winking pattern, as illustrated in FIGS. 3 and 6. Accordingly, by diminishing the decision level $\Delta$, the detection of jamming by an interference wave (a signal collision) can be easily detected, permitting the detection of an interference wave (a collision) of a low level. Furthermore, the regeneration of the received signal is carried out based on the decision in the latter half (the binary portion $P_2$ of the eye pattern) of the winking pattern, and hence the regenerated output codes hardly include errors caused by the interference wave. Since the threshold value $\Delta$ is small, the decision circuit 4 can be used to carry out decision at both the first half and the second half of the winking pattern.

In the case of using the arrangement of FIG. 13 as the ½-frequency divider, the continuous application thereto of phase inverting input signals will not pose any problem, and accordingly, the same operations as described above can be achieved even by applying the signal S, instead of the coding rule violation signal T, to the AND gate 25 in FIG. 17.

Figure 21:
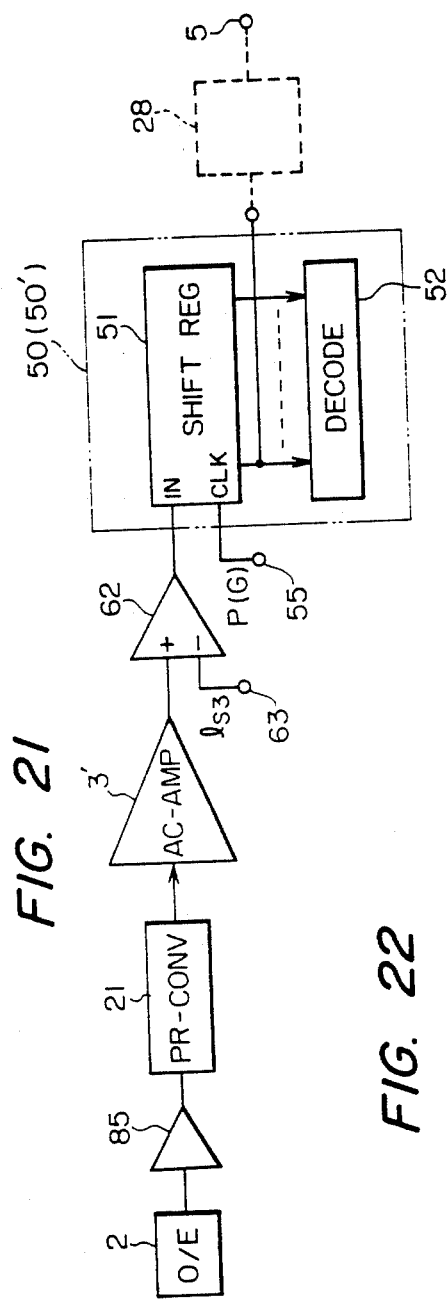
FIG. 21 is a block diagram illustrating a part of a modified form of the receiving apparatus of the present invention.

Though described previously with regard to the first embodiment, the output of the optoelectric transducer 2 may also be provided to the partial response circuit 21 after being amplified by an AC-coupling amplifier 85 as required, as depicted in FIG. 21. In this case, the input levels to the amplifiers 3' and 85 and the partial response circuit 21 are determined so that their linearity may be retained, thereby preventing the noise figure of the partial response circuit 21 from affecting the entire receiving apparatus. Within such a range in which linearity is retained, even if the amplifier 85 is disposed at the preceding stage of the partial response circuit 21, a DC component can be removed by the partial response circuit 21 in a short time and the optimal decision level does not undergo such variations as shown in FIG. 2C; therefore, a high-speed response to the burst input signal can be achieved. The flip-flop 64 in the decision circuit 4 described in respect of FIG. 7 may also be used as the first stage of the asynchronous pattern detector 50 or the coding rule violation detector 50'. As illustrated in FIG. 21, the output of the AC-coupling amplifier 3' is provided to a comparator 62, the output of which is applied to the shift register 51 and input thereinto by the clock P or the timing signal G from the terminal 55. The decided output R can be derived from any one of the shift stages of the shift register 51, for example, from the first stage thereof.

Figure 22:
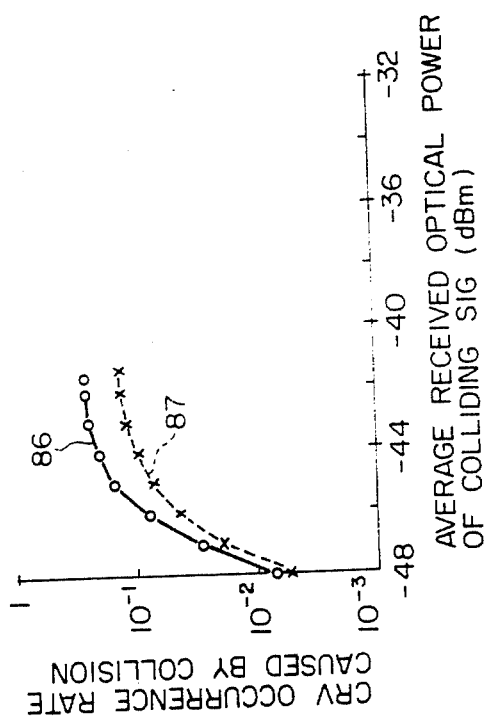
FIG. 22 is a graph showing examples of measured values of coding rule violations.

FIG. 22 shows examples of coding rule violations (CRV) measured when the present invention was applied to a receiving apparatus of a 32 Mb/s information transmission rate. In this case, a main signal and a colliding signal are both random signals. The average received optical power of the main signal is $-35$ dBm. The abscissa represents the average received power of the colliding signal and the ordinate the occurrence rate of coding rule violations relative to the information transmitting clock frequency. For structural reasons of the receiving apparatus employed in the experiment, the coding rule violations were detected for all of the four patterns depicted in FIG. 6. The curve 86 shows the case where the phase difference between the main signal and the colliding signal is $\pi$, and the curve 87 shows the case where the phase difference is 0.

The CRV occurrence rate in the absence of a signal collision is as low as $10^{-6}$, but it is seen from FIG. 22 that once the collision occurs, even if the colliding signal is 10 dB lower in optical power than the main signal, the CRV occurrence rate rises as high as 0.1 or so and CRV pulses are generated at the rate of one bit to about 10 bits. Accordingly, the signal collision can be quickly detected by detecting the CRV pulses. The CRV occurrence rate may drop down to approximately $10^{-2}$ depending on the phase relationship between the main signal and the colliding signal and some other conditions, but in this case, too, the CRV pulses are produced at the rate of one bit to 100 bits, so that the signal collision can be detected within a sufficiently short time.

As has been described in the foregoing, the present invention has the advantages that an AC amplifier can be used in the burst receiving apparatus, that the time for a transient response to a burst input signal is short, that a collision of low-level signals can be detected, that the decision of a received signal is not much deteriorated and that a signal indicating abnormality of the synchronization of an information transmitting clock can be obtained from a coding rule violation. Further, the apparatus of the present invention can be formed by adding a small number of elements to conventional circuits. On account of such characteristic features, the present invention can be applied to a receiving apparatus for high-speed packet transmission and a CSMA/CD control receiving apparatus as well. While the present invention has been described as being applied to the optical burst signal receiving apparatus, it is apparent that the invention is also applicable to burst signal receiving apparatus for a transmission line which employs a coaxial cable or paired cable. Especially, in the optical transmission utilizing the intensity modulation technique, however, a 10 dB loss in terms of the optical power in the optical transmission line leads to a 20 dB loss of an electrical signal, and a collision is liable to occur between optical bursts of largely different levels, so that the present invention is of particular utility when employed for the detection of an optical burst collision. Moreover, by controlling the clock generator 40, a high-speed apparatus can be obtained with a relatively simple arrangement. Besides, no particular adjustment is needed for each receiving apparatus.

It is apparent that many modifications and variations may be effected without departing from the scope of the novel concepts of the present invention.

What is claimed is:

1. Apparatus for receiving a burst signal intensity-modulated by a signal obtained by Manchester-code converting each code of an input signal into a pair of codes, comprising:
   a partial response circuit for converting the received burst signal into an AC signal by a partial response conversion;
   an AC-coupling amplifier connected to the output side of the partial response circuit, for amplifying the AC signal;
   clock-generating means for generating, from the received burst signal, a clock signal corresponding to the timing of a latter one of the Manchester-coded pair codes; and
   a binary decision circuit connected to the output ends of the clock generating means and the AC-coupling amplifier, for deciding the output of the AC-coupling amplifier at the timing of the clock signal to provide a binary output.

2. Receiving apparatus according to claim 1, wherein the clock generating means is comprised of a timing extractor connected to a signal path from an input end for receiving the burst signal to the output side of the AC-coupling amplifier, for generating a timing signal of a frequency equal to a clock frequency of the Manchester-coded signal, a frequency divider circuit connected to the output side of the timing extractor, for frequency dividing the timing signal down to generate the clock signal having half the frequency of the timing signal, the frequency divider circuit being capable of inverting the phase of the clock signal by a phase inverting signal, and asynchronism detecting means connected to the output side of the binary decision circuit and supplied with the decision output therefrom, for detecting asynchronism between codes of the decision output and the clock signal and supplying the detected output as the phase inverting input signal to the frequency divider circuit.

3. Receiving apparatus according to claim 2, including reception detecting means for detecting the arrival of the burst signal, and means for supplying the detected output of the asynchronism detecting means as the phase inverting input signal to the frequency divider circuit solely for a fixed period of time after the detection by the reception detecting means.

4. Receiving apparatus according to claim 2, wherein the asynchronism detecting means is comprised of a shift register supplied with the decision output from the binary decision circuit at the timing of the clock signal, and a decoder for detecting that a code pattern stored in the shift register is not a predetermined synchronous pattern and for producing the phase inverting input signal.

5. Receiving apparatus according to claim 4, wherein the shift register has a two-stage structure, and wherein the decoder is comprised of an AND circuit supplied with first- and second-stage outputs of the shift register, a NOR circuit supplied with the first- and second-stage outputs of the shift register and an OR circuit supplied with the outputs of the AND and the NOR circuit.

6. Receiving apparatus according to claim 4 or 5, includes timing means for timing the output of the decoder by the clock signal to yield the asynchronism detected output.

7. Receiving apparatus according to claim 2, wherein the asynchronism detecting means is means supplied with the decision output of the binary decision circuit obtained by deciding the output of the AC-coupling amplifier by the timing signal, for detecting a coding rule violation in a plurality of successive decision output codes and providing the detected output as the phase inverting input signal.

8. Apparatus for receiving a burst signal intensity-modulated by a signal obtained by Manchester-code converting each code of an input signal into a pair of codes, comprising:
   a partial response circuit for converting the received burst signal into an AC signal by a partial response conversion;
   a timing extractor for generating, from the received burst signal, a timing signal of the same frequency as a clock frequency of the Manchester-coded signal;
   a binary decision circuit connected to the output ends of the timing extractor and the partial response circuit, for deciding the output of the partial response circuit by the timing signal at a decision level slightly apart from zero at the timing corresponding to each code of the Manchester-coded pair codes;
   a coding rule violation detector connected to the output side of the binary decision circuit and supplied with the decision output therefrom, for detecting a coding rule violation in a plurality of successive decision output codes and providing the detected output as an abnormality of the received signal.

9. Receiving apparatus according to claim 8, including clock generating means connected to the output ends of the timing extractor and the coding rule violation detector, for generating a clock signal corresponding to the timing of a latter one of the Manchester-coded pair codes, and a second decision circuit connected to the output ends of the clock generating means and the binary decision circuit, for deciding the decision output by the clock signal.

10. Receiving apparatus according to claim 9, wherein the clock generating means is comprised of a frequency divider circuit, connected to the output side of the timing extractor, for frequency dividing the timing signal down to generate the clock signal having half the frequency of the timing signal, the frequency divider circuit being capable of inverting the phase of the clock signal by a phase inverting signal, and phase inverting input signal supply means for supplying the detected output of the coding rule violation detector, as the phase inverting input signal, to the frequency divider circuit.

11. Receiving apparatus according to claim 10, including reception detecting means for detecting the arrival of the burst signal, and means for enabling the phase inverting input signal supply means only for a fixed period of time after the detection of the arrival of the burst signal by the reception detecting means.

12. Receiving apparatus according to claim 11, wherein an AC-coupling amplifier is connected in series between the partial response circuit and the binary decision circuit.

13. Receiving apparatus according to claim 12, wherein the coding rule violation detector is comprised of a shift register supplied with the decision output at the timing of the timing signal, and a decoder supplied with a code in each shift stage of the shift register to detect and output the coding rule violation.

14. Receiving apparatus according to claim 13, wherein the shift register has a three-stage structure, and wherein the decoder is comprised of an AND circuit supplied with the output of each stage of the shift register, a NOR circuit supplied with the outputs of the second and third stages of the shift register, and an OR circuit supplied with the outputs of the AND circuit and the NOR circuit.

15. Receiving apparatus according to claim 13, wherein the shift register has a three-stage structure, and wherein the decoder is comprised of an AND circuit supplied with the outputs of the first and third stages of the shift register, and an exclusive OR circuit supplied with the output of the second stage of the shift register and the output of the AND circuit.

16. Receiving apparatus according to claim 13, 14 or 15, including means for timing the decoder output by the timing signal to provide it as the coding rule violation output.

17. Receiving apparatus according to any one of claims 8, 10, 11, 12 and 13, wherein the decision level of the binary decision circuit is apart from zero by a value greater than $+\frac{1}{2}\epsilon$ or $-\frac{1}{2}\epsilon$ where $\epsilon$ is a decision ambiguity width of the binary decision circuit.

18. Receiving apparatus according to claim 13, wherein the output of the binary decision circuit is supplied to the second decision circuit via at least one stage of the shift register.

19. Receiving apparatus according to claim 9 or 18, wherein the second decision circuit is a circuit for ANDing the decision output of the binary decision circuit and the clock signal.

20. Receiving apparatus according to claim 9 or 18, wherein the second decision circuit is a flip-flop which inputs and outputs the decision output of the binary decision circuit at the timing of the clock signal.

21. Receiving apparatus according to claim 2 or 12, wherein the timing extractor is comprised of a circuit for differentiating or differencing a signal input thereto, a rectifier for full-wave rectifying the differentiated or differenced output, and a tank circuit supplied with the rectified output and tuned to a frequency equal to the clock frequency of the Manchester-coded signal.

22. Receiving apparatus according to claim 21, wherein the timing extractor is connected to a signal path from the output side of the partial response circuit to the output side of the AC-coupling amplifier.

23. Receiving apparatus according to claim 2 or 12, wherein the timing extractor is connected to a signal path preceding the input side of the partial response circuit.

24. Receiving apparatus according to claim 3 or 11, wherein the reception detecting means is means for detecting a carrier component of the burst signal.

25. Receiving apparatus according to claim 2 or 12, wherein the frequency divider circuit is comprised of a $\frac{1}{2}$-frequency divider for frequency dividing the timing signal and producing two outputs with reverse polarities with each other, and selecting means for selecting one of the two outputs from the $\frac{1}{2}$-frequency divider in accordance with the phase inverting input signal.

26. Receiving apparatus according to claim 25, wherein the $\frac{1}{2}$-frequency divider is a T flip-flop; the T flip-flop outputs of reverse polarities are ANDed with the phase inverting input signal in first and second AND circuits, respectively; and R-S flip-flop is set and reset by the outputs of the first and second AND circuits; and, in accordance with the output of the R-S flip-flop, one of the outputs of the T flip-flop is provided by the exclusive OR circuit, as the clock signal of the same or opposite polarity.

27. Receiving apparatus according to claim 2 or 12, wherein the frequency divider circuit is comprised of a $\frac{1}{2}$-frequency divider for frequency dividing the timing signal to output it as the clock signal, and means for inhibiting one of pulses of timing signals input into the $\frac{1}{2}$-frequency divider, by the phase inverting input signal.

28. Receiving apparatus according to claim 2 or 12, wherein the frequency divider circuit is comprised of a $\frac{1}{2}$-frequency divider for frequency dividing the timing signal to output it as the clock signal, and means for providing in succession, as one signal, two adjacent ones of timing signals input into the $\frac{1}{2}$-frequency divider, by the phase inverting input signal.

29. Receiving apparatus according to any one of claims 1 to 4 and 8 to 13, wherein the burst signal is an optical signal, and which includes an optoelectric transducer for converting a received optical burst signal into an electrical signal for input to the partial response circuit.

30. Receiving apparatus according to claim 4 or 13, wherein the binary decision circuit is comprised of a comparator for comparing the output of the AC-coupling amplifier and a decision level, and a first stage of the shift register.

* * * * *